United States Patent
Day et al.

(10) Patent No.: US 7,565,659 B2
(45) Date of Patent: Jul. 21, 2009

(54) LIGHT WEIGHT CONTEXT SWITCHING

(75) Inventors: Michael Norman Day, Round Rock, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 10/891,773

(22) Filed: Jul. 15, 2004

(65) Prior Publication Data

US 2006/0015876 A1    Jan. 19, 2006

(51) Int. Cl.
 *G06F 9/46* (2006.01)
(52) U.S. Cl. .................. 718/108; 718/102; 718/103
(58) Field of Classification Search .......... 718/102, 718/103, 104, 108, 100
See application file for complete search history.

(56) References Cited

U.S. PATENT DOCUMENTS

| | | | | |
|---|---|---|---|---|
| 5,179,702 A | * | 1/1993 | Spix et al. ................. | 718/102 |
| 5,799,188 A | * | 8/1998 | Manikundalam et al. .... | 718/108 |
| 6,061,709 A | * | 5/2000 | Bronte ..................... | 718/103 |
| 6,195,676 B1 | * | 2/2001 | Spix et al. ................. | 718/107 |
| 6,385,727 B1 | * | 5/2002 | Cassagnol et al. .......... | 713/193 |
| 6,615,281 B1 | * | 9/2003 | Temple, III .............. | 713/375 |
| 6,968,557 B1 | * | 11/2005 | Zhang et al. .............. | 719/319 |
| 7,051,330 B1 | * | 5/2006 | Kaler et al. ............... | 718/106 |
| 2002/0002667 A1 | * | 1/2002 | Kelsey et al. ............. | 712/228 |
| 2003/0163589 A1 | * | 8/2003 | Bunce et al. .............. | 709/250 |
| 2003/0187612 A1 | * | 10/2003 | Miyake .................... | 702/176 |
| 2005/0015767 A1 | * | 1/2005 | Nash et al. ............... | 718/102 |
| 2005/0086030 A1 | * | 4/2005 | Zeidman ................... | 703/1 |

* cited by examiner

*Primary Examiner*—Meng-Ai An
*Assistant Examiner*—Caroline Arcos
(74) *Attorney, Agent, or Firm*—Stephen R. Tkacs; Stephen J. Walder, Jr.; Matthew B. Talpis

(57) ABSTRACT

To alleviate at least some of the costs associated with context switching, addition fields, either with associated Application Program Interfaces (APIs) or coupled to application modules, can be employed to indicate points of light weight context during the operation of an application. Therefore, an operating system can pre-empt applications at points where the context is relatively light, reducing the costs on both storage and bus usage.

3 Claims, 5 Drawing Sheets

LIGHT WEIGHT CONTEXT SWITCHING

FIELD OF THE INVENTION

The present invention relates generally to timesharing, and more particularly, to context switching between different applications on processors with large active contexts.

DESCRIPTION OF THE RELATED ART

In newer computer architectures today, multiple synergistic processing units (SPUs) are employed in conjunction with more conventional primary processing units. For example, a cell processor contains a PowerPC®, available from the International Business Machine Corp., Old Orchard Road, Armonk, N.Y. 10504, primary processor core that coupled to 8 SPUs. The SPUs can be of a variety of types including, but not limited to, Single Instruction Multiple Data (SIMD) processors, which have both large register files and their own local storage for instructions and data. Typically included with each of the multiple processors is a Direct Memory Access Controller (DMAC) that allows for rapid transmission of data between the SPU processor's local store and the various system memories or other SPU local stores across a bus.

These processors are enabled to perform a large number of applications simultaneously. However, simultaneity of execution is essentially a misnomer when the number of applications exceeds the number of physical processing units. The resources of the processors are shared, meaning that applications generally are not functioning in parallel because the physical processor is shared with other applications. An example of sharing resources is timesharing or time-slicing. Several operating systems, such as Linux, utilize time sharing techniques to allocate times at which an application may utilize physical resources.

Operating systems perform the timesharing by utilizing several processes: scheduling, pre-emption, and dispatching. When multiple applications are running, the operating system schedules time at which each of the respective applications can occupy physical resources. Once the predetermined times for respective applications use of physical resources expire, the respective application is pre-empted to allow for other scheduled applications to utilize the physical resources. If, and when, the resources become free, either by completion or pre-emption, the operating system can dispatch additional applications to utilize the physical resources.

The pre-emption process for SPUs however, is an unusually costly process in the timesharing scheme. During pre-emption, the context of the application that is being pre-empted is stored. Then, later, the context is restored to continue operations. Conventional processors such as the Pentium®, available from Intel Corp., 2200 Mission College Blvd., Santa Clara, Calif. 95052, or the PowerPC®, have a fairly limited state and set of registers to save and utilize a shared memory managed by the virtual memory management system. This keeps the cost of context switching relatively small. However, cell processors containing a PowerPC® core each having multiple attached SPUs present a considerable amount of context to save and restore for each SPU. In other words, due to the large SPU context, including the register file (typically 128-128 bit registers), local storage (typically on the order of 256 Kb), 64 channels and DMA controller with active state and queued commands, a large amount of data has to be transferred across the bus and stored to save the context. Also, a large amount of data has to be restored from system memory to resume an SPU context. Hence, context switching for the cell processor incorporating these unconventional attached SPUs is very costly.

A conventional solution to the costs associated with context switching as related to heavy weight context systems is run-to-completion. Under the run-to-completion scheme, applications effectively occupy resources until the application is complete. However, run-to-completion schemes have poor performance and response characteristics. In a run-to-completion scheme, a few applications can easily occupy all of the resources while not allowing others to run. Hence, resources can be "hogged."

Therefore, there is a need for a method and/or apparatus for streamlining pre-emption processes in a computer system that addresses at least some of the problems associated with conventional methods and/or apparatus for timesharing.

SUMMARY OF THE INVENTION

In one illustrative embodiment, a method is provided for real-time utilization of a plurality of applications with a plurality of light weight context indicators. The method comprises receiving, by an operating system, a request from a main application task that requests usage of synergistic processing unit resources by specifying a plurality of synergistic processing unit tasks that are to be executed on at least one synergistic processing unit, detecting and parsing, by the operating system, a light yield field set for each synergistic processing unit task of the plurality of synergistic processing unit tasks, and scheduling, by the operating system, application run times for each synergistic processing unit task of the plurality of synergistic processing unit tasks based on priority, context switching cost information, and whether each synergistic processing unit task has real time guarantees using the light yield field set of each synergistic processing unit task. The method further comprises dispatching, by the operating system, a first synergistic processing unit task of the plurality of synergistic processing unit tasks to a given synergistic processing unit within the at least one synergistic processing unit and determining, by the operating system, whether a scheduled time to preempt the first synergistic processing unit task on the given synergistic processing unit is reached. Responsive to a determination that the scheduled time to preempt the first synergistic processing unit task on the given synergistic processing unit is reached, the method notifies the first synergistic processing unit task to proceed to a light weight context point based on the light yield field set of the first synergistic processing unit task. Responsive to a determination that the first synergistic processing unit task has reached a light weight context point, the operating system performs a light weight context save operation to save a context of the first synergistic processing unit task and dispatches a second synergistic processing unit task of the plurality of synergistic processing unit tasks to the given synergistic processing unit.

In another illustrative embodiment, an apparatus is provided comprising a processor and a memory coupled to the processor. The memory comprises instructions which, when executed by the processor, cause the processor to receive, by an operating system, a request from a main application task that requests usage of synergistic processing unit resources by specifying a plurality of synergistic processing unit tasks that are to be executed on at least one synergistic processing unit, detect and parsing, by the operating system, a light yield field set for each synergistic processing unit task of the plurality of synergistic processing unit tasks, schedule, by the operating system, application run times for each synergistic processing unit task of the plurality of synergistic processing unit tasks based on priority, context switching cost information, and whether each synergistic processing unit task has real time guarantees using the light yield field set of each synergistic processing unit task, and dispatch, by the operating system, a first synergistic processing unit task of the plurality of synergistic processing unit tasks to a given synergistic processing unit within the at least one synergistic processing unit. The instructions further cause the processor to determine, by the operating system, whether a scheduled time to preempt the first synergistic processing unit task on the given synergistic processing unit is reached. Responsive to a determination that the scheduled time to preempt the first synergistic processing unit task on the given synergistic processing unit is reached, the instructions cause the processor to notify the first synergistic processing unit task to proceed to a light weight context point based on the light yield field set of the first synergistic processing unit task. Responsive to a determination that the first synergistic processing unit task has reached a light weight context point, the operating system performs a light weight context save operation to save a context of the first synergistic processing unit task and dispatches a second synergistic processing unit task of the plurality of synergistic processing unit tasks to the given synergistic processing unit.

In another illustrative embodiment, a computer program product comprises a computer recordable medium having a computer readable program recorded thereon. The computer readable program, when executed on a computing device, causes the computing device to receive, by an operating system, a request from a main application task that requests usage of synergistic processing unit resources by specifying a plurality of synergistic processing unit tasks that are to be executed on at least one synergistic processing unit, detect and parsing, by the operating system, a light yield field set for each synergistic processing unit task of the plurality of synergistic processing unit tasks, schedule, by the operating system, application run times for each synergistic processing unit task of the plurality of synergistic processing unit tasks based on priority, context switching cost information, and whether each synergistic processing unit task has real time guarantees using the light yield field set of each synergistic processing unit task, dispatch, by the operating system, a first synergistic processing unit task of the plurality of synergistic processing unit tasks to a given synergistic processing unit within the at least one synergistic processing unit, and determine, by the operating system, whether a scheduled time to preempt the first synergistic processing unit task on the given synergistic processing unit is reached. Responsive to a determination that the scheduled time to preempt the first synergistic processing unit task on the given synergistic processing unit is reached, the computer readable program further causes the computing device to notify the first synergistic processing unit task to proceed to a light weight context point based on the light yield field set of the first synergistic processing unit task. Responsive to a determination that the first synergistic processing unit task has reached a light weight context point, the operating system performs a light weight context save operation to save a context of the first synergistic processing unit task and dispatches a second synergistic processing unit task of the plurality of synergistic processing unit tasks to the given synergistic processing unit.

These and other features and advantages will be described in, or will become apparent to those of ordinary skill in the art in view of, the following detailed description of the example embodiments.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
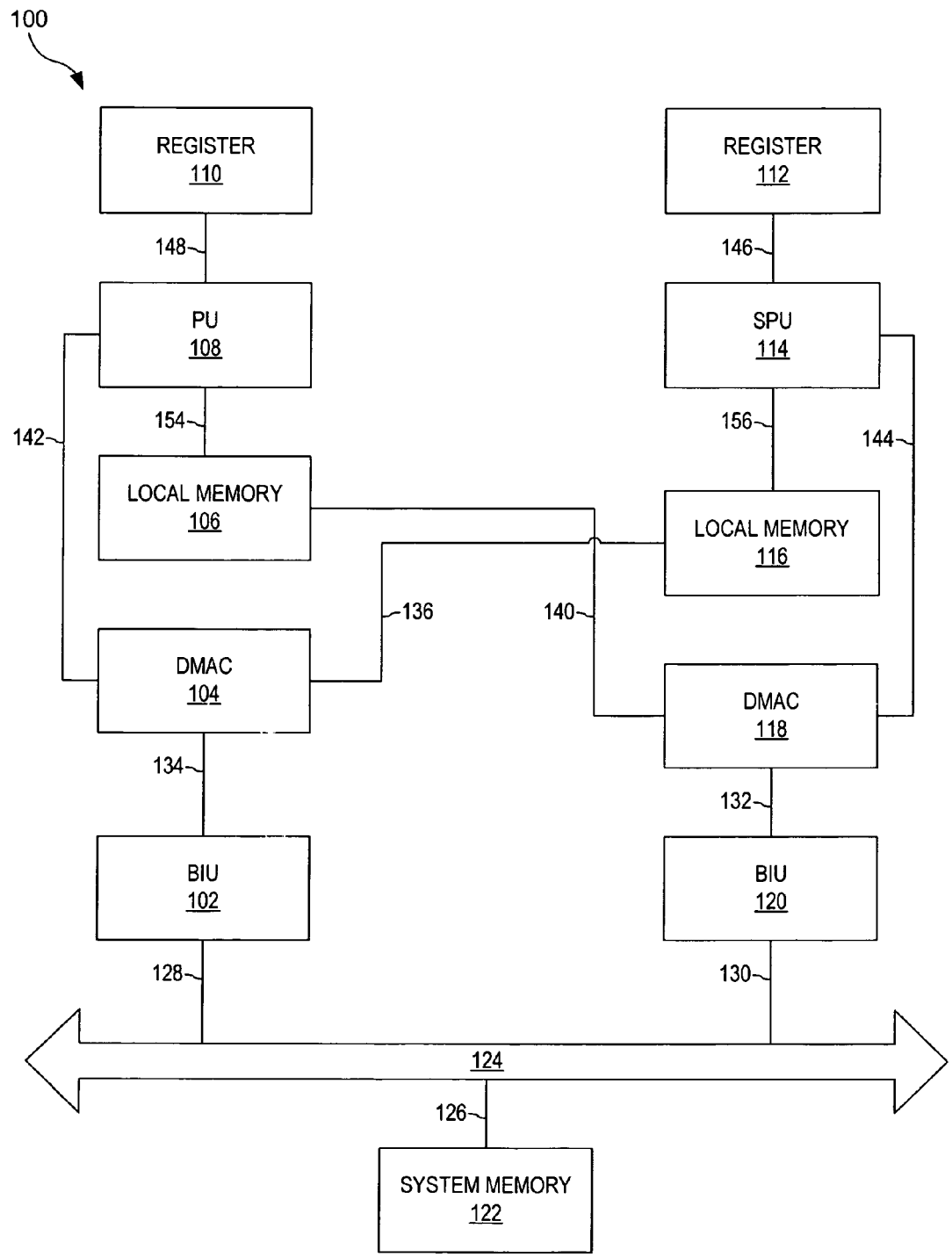
FIG. 1 is a block diagram depicting an example of a Cell multiprocessor system.

Referring to FIG. 1 of the drawings, the reference numeral 100 generally designates an example of a multiprocessor system. The system 100 comprises a processing unit (PU) 108, a synergetic processing unit (SPU) 114, a first register file 110, a second register file 112, a first local memory 106, a second local memory 116, a first Direct Access Memory Controller (DMAC) 104, a second DMAC 118, a first Bus Interface Unit (BIU) 102, a second BIU 120, a bus 124, and a system memory 122. The system 100 is an example of a multiprocessor, and it is possible to have more processors, caches, registers, and other memories.

In order for the system 100 to function, each of the components have to be interconnected. The PU 108 is coupled to the first register file 110, the first local memory 106, and the first DMAC 104 through a first communication channel 148, a second communication channel 154, and a third communication channel 142, respectively. The SPU 114 is coupled to the second register file 112, the second local memory 116, and the second DMAC 118 through a fourth communication channel 146, a fifth communication channel 156, and a sixth communication channel 144, respectively. The first DMAC 104 is then coupled to the first BIU 102, and the second local memory 116 through a seventh communication channel 134, and an eighth communication channel 136, respectively. The second DMAC 118 is then coupled to the second BIU 120, and the first local memory 106 through a ninth communication channel 132, and a tenth communication channel 140, respectively. Additionally, the bus 124 is coupled to the first BIU 102, the second BIU 120, and the system memory 122 through a eleventh communication channel 128, a twelfth communication channel 130, and a thirteenth communication channel 126.

The system 100 functions by transferring data between the various processors and memories. The respective DMACs perform a substantial number of data transfers. Additionally, the respective processing units also can transfer data directly to and from memories and their respective register files. Typically, though, many SPU processors, such as employed in the system 100, are attached SIMD processors, employing a heavy weight context. In other words, performance intensive applications that make full use of the large register files and local store on each SPU are used.

Figure 2:
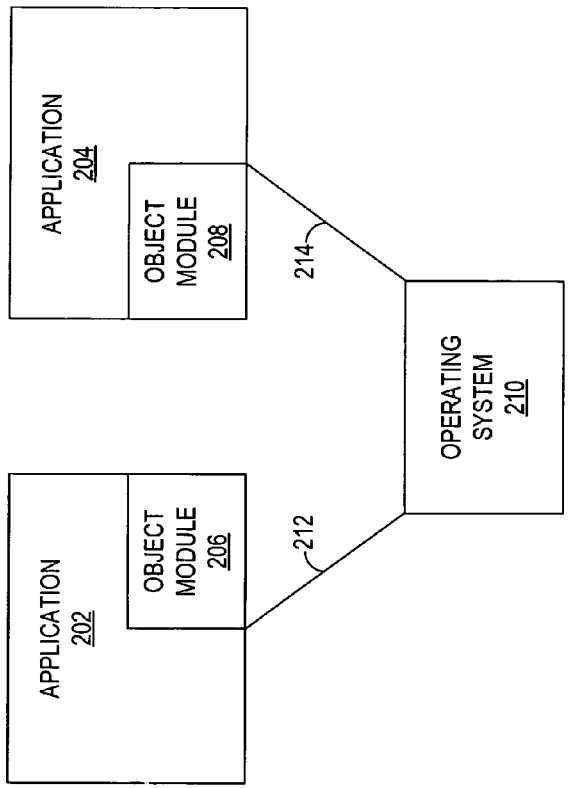
FIG. 2 is a block diagram depicting functioning operating system and applications.

To function, operating systems overlaid on a system, such as on the PU 108 in the system 100, govern the operation of the system. Referring to FIG. 2 of the drawings, the reference numeral generally designates overlaid operating system and applications. The overlaid system 200 comprises a first application 202, a second application 204, and an operating system 210. Also, the first application 202 and the second application 204 contain a first object module 206 and a second object module 208, respectively.

The operating system performs the normal operations to timeshare amongst the various applications utilizing resources on the physical PU, such as the PU 108. Scheduling times for a respective application to function is an example of a normal operation. However, during operation, the operating system loads an object module of one of the respective applications, which uses physical SPU resources. The operating system 210 can also store context of an application's physical resources for later usage once the allocated time of usage of resources has expired. The first object module 206 and the second object module 208 are communicated to the operating system 210 through a first communication channel 212 and a second communication channel 214, respectively.

For an operating system, such as the operating system 210, to be able to more efficiently context switch between applications, the respective modules of the application are modified. Essentially, there are two manners to efficiently context switch between operations: modification of the module or the use of Application Program Interfaces (API). The functionality of the two manners is essentially the same. With a modification to the module, additional fields are attached to the module to assist in the operations and in context switching. However, APIs make specific requests of the operating system to allow adaptation to dynamic runtime conditions.

Figure 3:
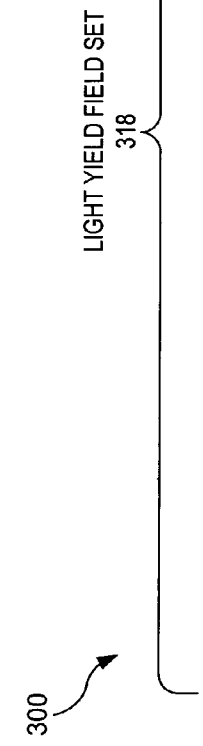
FIG. 3 is a block diagram depicting a modified module for an application.

Referring to FIG. 3 of the drawings, the reference numeral 300 generally designates a modified module for an application. The modified module comprises a module 302, and a light yield field set 318. The light yield field set 318 further comprises a first register range field 304, a second register range field 306 a first local store field 308, a second local store field 310, a stop code field 312, a first channel range field 314, a second channel range field 315, and a yield delay 316. Also, it is possible for an operating system to process a module, such as the module 302, without a light yield field set. Additionally, there can be more fields included into the light yield field set 318 to encompass the operation of more memory devices utilized by an SPU.

Each of the additional fields that are included in the light yield field set 318 are used to define the light weight context when pre-empted tasks have reached their light weight yield point. The first register range field 304 and the second register range field 306 are utilized together to indicate the beginning and ending register numbers, respectively, for the operating system to save or restore during a context switch. The first local store field 308 and the second local store field 310 are the beginning and ending local store addresses, respectively, for the operating system to store or restore during a context switch. The stop code field 312 is a field utilized to indicate an acknowledgement to the operating system, such as the operating system 210, of a requested light weight yield for an application. The first channel range field 314 and the second channel range field 315 are the beginning and ending channel addresses for the operating system to store or restore during a context switch, respectively. The yield delay field 316 is the maximum amount of time the application will take between a light weight yield request and the application reaching and acknowledging the acquisition of the light weight context point. Typically, the time span is measured in system cycles, so that the value is independent of operating frequency. However, the operating system, such as the operating system 210, knowing the cycle time of the specific processor implementation and the yield delay field 316 can calculate the delay in real time.

Figure 4:
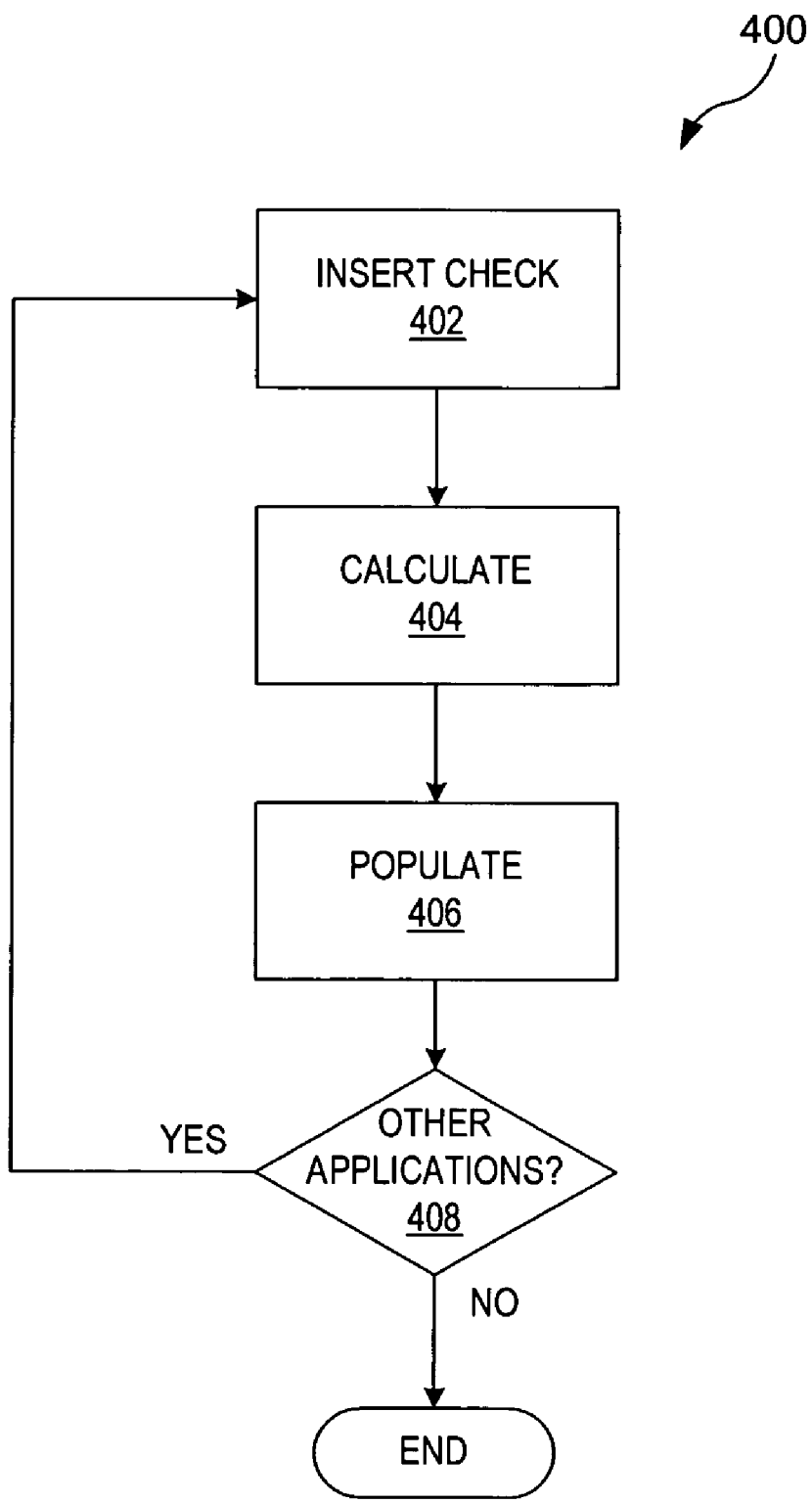
FIG. 4 is a flow chart depicting the population of a light yield field set.

In order to be able to utilize the modifications to the module or with APIs, the characteristics of applications are determined and stored for usage. Referring to FIG. 4 of the drawings, the reference numeral 400 comprises a flow chart for populating the fields of a modified module or API. The determination and storage of application data is accomplished by virtue of a programmer, compiler, or other development tools.

In many SIMD type processors, such as the SPU 114, the application task comprises three distinct phases: loop initialization, inner/outer loop phase, and loop results phase. Loop initialization occurs when a application makes a request, while the loop results occurs at application termination or when results are produced. The inner/outer loop phase, however, is essentially the operations phase of an application. During the inner/outer loop phase, there can be a relatively high context content. For example, in an inner/outer loop phase, there can be a large number of registers utilized, a large number of outstanding DMA operations, large amounts of data buffered in local store, and so forth. However, there is typically a natural point of the task in the loop initialization or loop results phase where the context is relatively light. For example, there can be few registers used, no buffers remaining in local store, no uncompleted DMA operations outstanding, and so forth.

Using the process 400, a programmer, compiler, or another development tool can determine the characteristics of an application. In step 402, the programmer or compiler can insert a check for light weight context yield requested, such as in step 640 of FIG. 6. For example, on SPU 114 of FIG. 1, a branch on attention event or attention interrupt can be used. A programmer, compiler, or other development tool can make measurements and calculate the worst case number of cycles to reach the light weight context point from the from the deepest point in the inner/outer loop to the yield request detection point, such as a branch on attention event or an attention interrupt, in step 404.

Once all of the calculations and measurements have been made, then the measurements and calculations can be applied through the light yield field 318 in FIG. 3. The programmer, compiler, or other development tool can add or populate the fields of the modified module, such as the module 300, or utilize a runtime API call in step 406. Once the modified module or runtime API has been populated with the application data, then a determination is made as to whether another application task is to be mapped in step 408. If there is another application task then, the process begins again in step 402. Also, a programmer, compiler, or other development tool can track which resources have a required state in them at the light weight context point by using resource tracking techniques in common use (not shown). For example, a determination is made as to which registers, to what area of local store, or to which channels have a required state. The tracked information can then be added to the modified module light yield field 318 information or runtime API by a programmer, compiler, or other development tool during the application development procedure, step 406.

Figure 5:
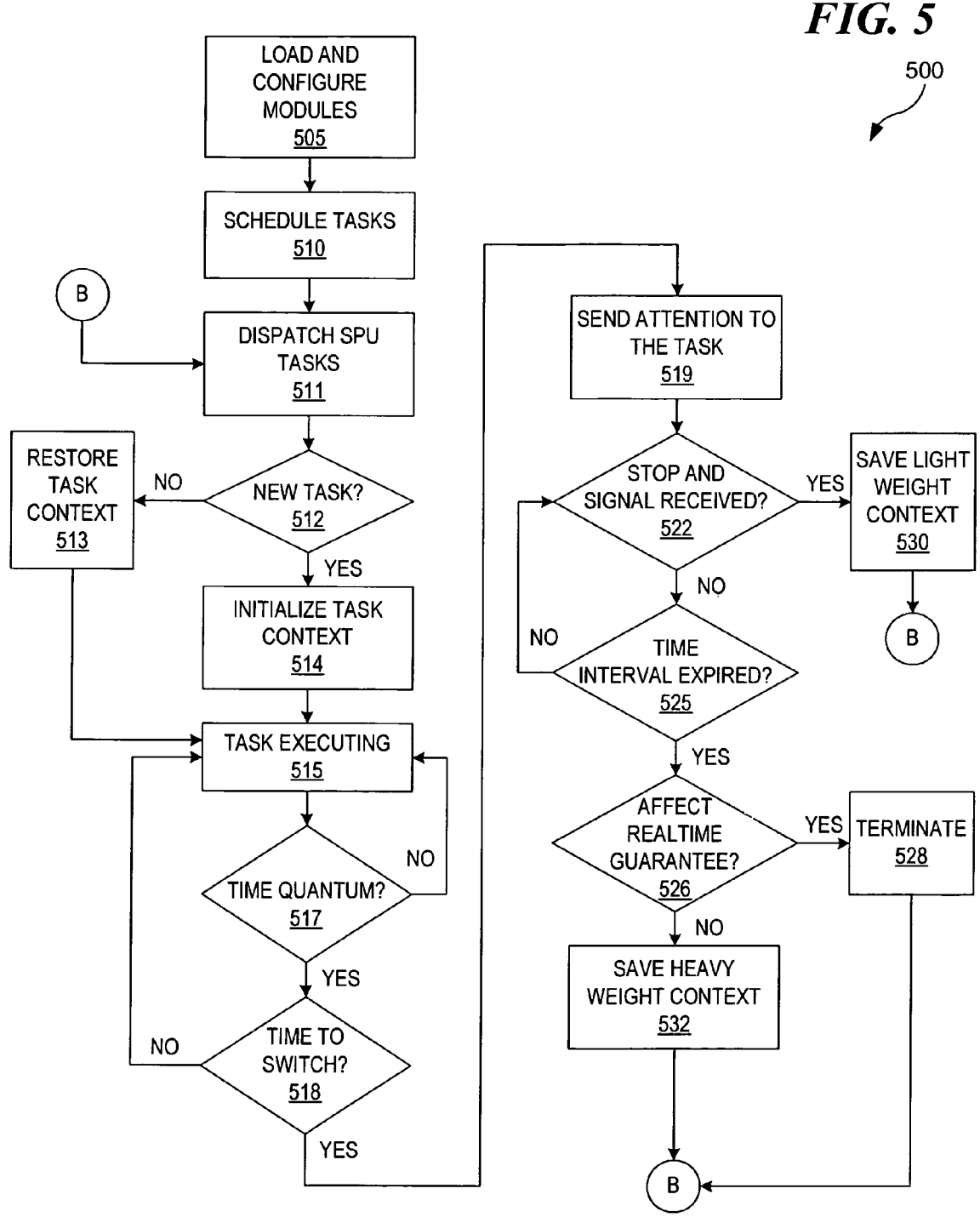
FIG. 5 is a flow chart depicting the operation of an operating system supporting one or more applications.
Figure 6:
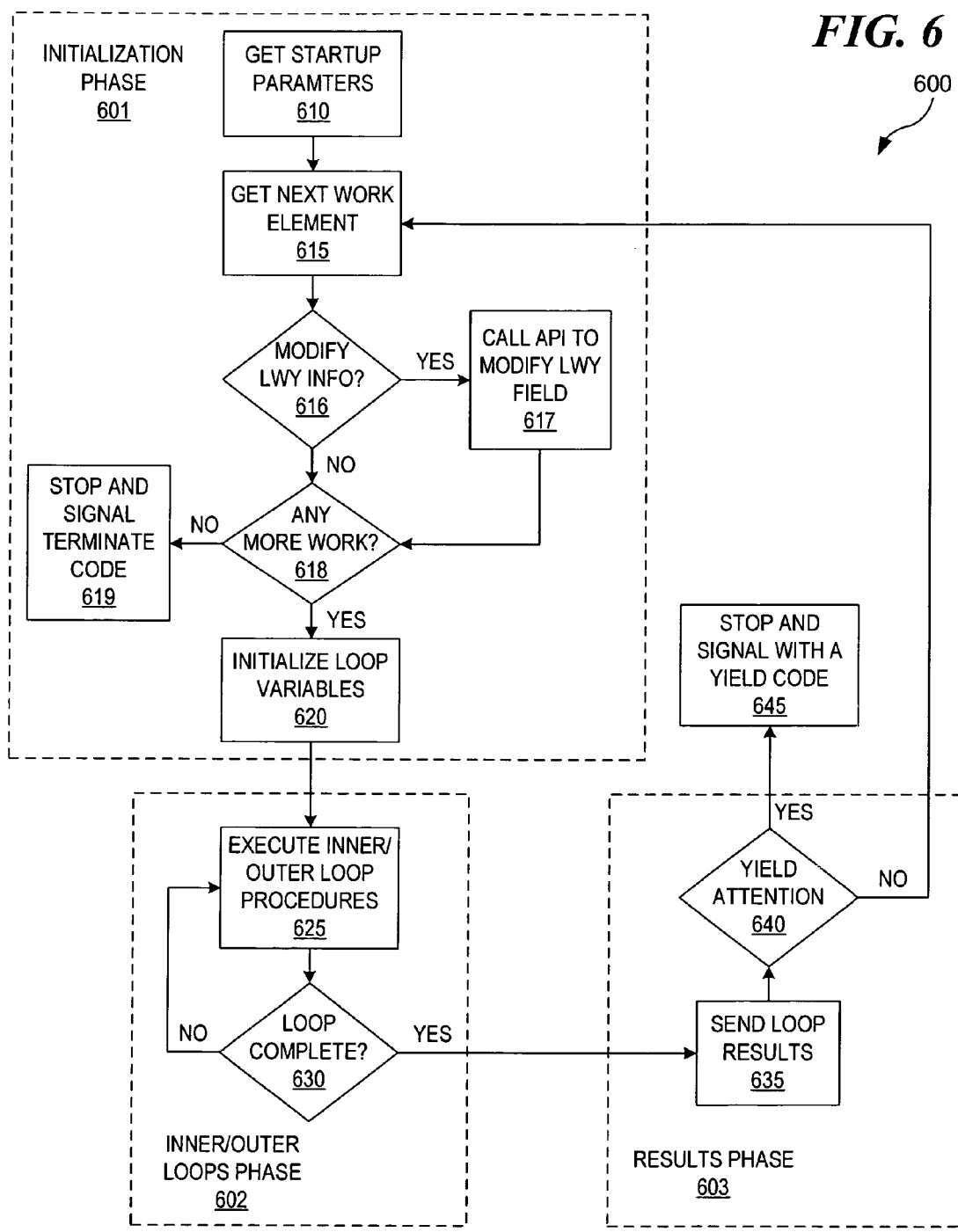
FIG. 6 is a flow chart depicting the operation of an SPU task supporting light weight yield.

However, the existence of additional fields added to the module 302 or an API by the programmer, compiler, or other development tool at application build time is of little use unless illustrated in context. Referring to FIG. 5 of the drawings, the reference numeral 500 generally designates a flow chart depicting the operation of an operating system supporting one or more applications. The applications can be a variety of applications that range from graphically based programs to system programs. Typically, the applications are broken up into several tasks, or operations, that each are performed individually and occupy resources. FIGS. 5 and 6 depict an operating system supporting application tasks utilizing the light weight context switching technique.

During step 505 the main application task requests usage of SPC resources by specifying one or more SPU tasks that are to be executed. When the SPU modules for the specified tasks are loaded by the operating system, the operating system typically detects and parses the light yield field set 318. Based on runtime information, the main application may choose to utilize APIs to modify the information in the various SPU modules light yield field sets 318. Once the tasks have been specified to the operating system, they are scheduled for execution.

In step 510, a schedule is developed by the operating system to determine when and in what order various application tasks are to be allocated physical resources and executed. The operating system utilizes new or existing scheduling algorithms to schedule times of usage of SPU resources for each of the application's SPU based tasks. In making a determination of scheduling, comparisons between already executing SPU modules are made to determine times of pre-emption and dispatch of the respective application tasks. Characteristics, such as priority and context switching cost information, are taken into account to determine the overall cost and efficiency of the respective pre-emption and context switches.

In a system with real time guarantees, a real time schedule is created by the operating system to ensure that all real time deadlines are met by the application tasks. The operating system can account for context save and restore times for light weight yield tasks by utilizing an algorithm based off context size information in the Light Yield Field Set 318. If the task does not support light weight yields, the algorithm assumes the cost of a full context switch. When the real time schedule calls for the new light weight yield task to start at some time, the operating system calculates yield request time by subtracting the currently running tasks yield delay 316, the currently running tasks context save time (not shown), and the new task context restore time (not shown).

In step 511, the next scheduled SPU task is assigned physical resources and started (dispatched). A check is made in step 512 to determine if the task being dispatched is new. If new, the task is initialized on the physical resource in step 514. If it is an existing task, the task's saved context is restored to the physical resource in step 513. While the operating system is doing other work on the PU, such as the PU 108 of FIG. 1, and SPU tasks are executing in step 515, it frequently checks the time quantum in step 517. In step 518, if the time quantum has elapsed the operating system determines if it is time to pre-empt the running SPU task based on the schedule created in step 510. If not, the loop continues while tasks are executing.

In step 518, the operating system determines if the scheduled time for SPU task yield of the physical resources has been reached. When the proper timing for the context yield request occurs, the operating system utilizes a privileged attention command in step 519 to notify the executing task in the SPU to proceed into a light weight context state. The operating system detects this stop and signal with yield code 312 in step 522.

While waiting for the SPU task to reach it's light weight context point in step 525 and if no stop and signal with yield coded 312 is received, the system compares the actual time elapsed since the attention was sent to the specified yield time to determine if there is a failure to stop in the allotted time. This specified yield time that the operating system waits is the time period calculated by using information in the yield delay field 316.

When the operation has not entered into a light weight context state in the predetermined period, a determination is made to the affect on the impact of real-time guarantees or interactive response time in step 526. The operating system can choose to perform a heavy weight context save of an SPU task in step 532 if no real-time guarantees or interactive response will be impacted by doing so. Alternatively, the operating system can terminate the task and notify the application in step 528. Then, upon termination or a heavy weight context save, the next scheduled SPU task is dispatched in step 511.

On the other hand, once a light weight context point has been reached within the allotted time, it is now safe to perform the light weight context save operation. The task's light weight context is saved in step 530. At a light weight context point, the queues of an SPU DMAC, such as the second DMAC 118, should be empty, to further reduce the state that must be saved and restored as part of the context. A reason for having an empty DMAC queue is that the DMAC state data transfer is typically very costly in terms of the number of operations required. The DMAC hardware provides a queue Empty indicator (not shown) to assist the operating system in determining if DMA state must be saved. Then, upon completion of the light weight context save in step 530 the next scheduled operation is dispatched in step 511.

However, to establish a normal mode of operation, the applications are divided into phases so that light-weight and heavy-weight context points can be established. Referring to FIG. 6 of the drawings, the reference numeral 600 generally designates a flow chart depicting the operation of an SPU task supporting light weight yield. The SPU task is divided into three sections that designate the particular phases of operation: the initialization phase 601, the inner/outer loop phase 602, and the results phase 603.

In the initialization phase 601, an application's SPU task begins to execute the code loaded from the module 302. Startup parameters are obtained from memory in step 610. A next element of work is obtained in step 615. Once obtained, a determination is made as to whether there is work that requires adjustment to the light yield field set 318 in step 616. If so, an SPU application program interface (API) can be used in step 617 to update the light yield field set 318. Typically, modifications to the light yield field set 318 are as a result of overlays or "plug-in" to an application or application module. Therefore, there can be resultant changes in the module fields, such as in the yield delay field 316, or potentially local store range fields 308, 310.

Once a determination that there are no modifications or once the modifications are complete, a check for more work is then made in step 618. If there is no work, then the task exits, and a signal terminate code is issued in step 619. Initialization of loop variables then occurs in step 620.

Once the loop variables have been initialized, the task enters the inner/outer loops phase 602. During the inner/outer loops phase, the procedures associated with the task are executed in step 625. While the loop are executing, the operating system examines the loop phase to determine of the phase has completed. If the loop has not completed, then execution continues in step 630.

However, once the loop phase is complete, the loop results phase 603 is entered. The results of the loop are transmitted and stored in step 635. Then, once results are stored, a check for light weight yield attention is made in step 640. If no attention is pending, the task continues with step 615. However, if a light weight yield attention has been received, a stop and signal instruction is executed with signal code 312 in step 645.

The usage of light weight context switching has several advantages. Because the cooperative nature of the context switching, it allows for increased efficiency in scheduling and utilization of system resources. Also, because of the specification of resource usage by an application, data storage for context storage can be minimized. Due to minimizing the amount of data storage during a context switch, bus usages for transferring context data to/from memory decreases and associated operating system time for context switching decreases. Therefore, the technique of light weight context switching allows for efficient overall utilization of critical computer resources, especially in cases where resources are particularly valuable, such as real-time applications. Cooperative light-weight context switching technique can be used to provide efficient multi-tasking on processors where traditional "blind" context switching is prohibitive in the amount of time and resources required. This technique, therefore, results in very high yield of physical resources providing highly competitive price/performance systems. Mixed light weight yield and non-light weight yield applications can also co-exist on the same system and be scheduled accordingly. When the light weight yield application is loaded, an enforceable contract exists between the application programmer and the system provider to enable correct behavior for the system user.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for real-time utilization of a plurality of applications with a plurality of light weight context indicators, comprising:

receiving, by an operating system, a request from a main application task that requests usage of synergistic processing unit resources by specifying a plurality of synergistic processing unit tasks that are to be executed on at least one synergistic processing unit;

detecting and parsing, by the operating system, a light yield field set for each synergistic processing unit task of the plurality of synergistic processing unit tasks;

scheduling, by the operating system, application run times for each synergistic processing unit task of the plurality of synergistic processing unit tasks based on priority, context switching cost information, and whether each synergistic processing unit task has real time guarantees using the light yield field set of each synergistic processing unit task;

dispatching, by the operating system, a first synergistic processing unit task of the plurality of synergistic processing unit tasks to a given synergistic processing unit within the at least one synergistic processing unit;

determining, by the operating system, whether a scheduled time to preempt the first synergistic processing unit task on the given synergistic processing unit is reached;

responsive to a determination that the scheduled time to preempt the first synergistic processing unit task on the given synergistic processing unit is reached, notifying the first synergistic processing unit task to proceed to a light weight context point;

responsive to a determination that the first synergistic processing unit task has reached the light weight context point, performing, by the operating system, a light weight context save operation to save a light weight context defined by the light yield field set of the first synergistic processing unit task; and dispatching, by the operating system, a second synergistic processing unit task of the plurality of synergistic processing unit tasks to the given synergistic processing unit.

2. An apparatus comprising:

a processor; and a memory coupled to the processor, wherein the memory comprises instructions which, when executed by the processor, cause the processor to:

receive, by an operating system, a request from a main application task that requests usage of synergistic processing unit resources by specifying a plurality of synergistic processing unit tasks that are to be executed on at least one synergistic processing unit;

detect and parsing, by the operating system, a light yield field set for each synergistic processing unit task of the plurality of synergistic processing unit tasks;

schedule, by the operating system, application run times for each synergistic processing unit task of the plurality of synergistic processing unit tasks based on priority, context switching cost information, and whether each synergistic processing unit task has real time guarantees using the light yield field set of each synergistic processing unit task;

dispatch, by the operating system, a first synergistic processing unit task of the plurality of synergistic processing unit tasks to a given synergistic processing unit within the at least one synergistic processing unit;

determine, by the operating system, whether a scheduled time to preempt the first synergistic processing unit task on the given synergistic processing unit is reached;

responsive to a determination that the scheduled time to preempt the first synergistic processing unit task on the given synergistic processing unit is reached, notify the first synergistic processing unit task to proceed to a light weight context point;

responsive to a determination that the first synergistic processing unit task has reached the light weight context point, perform, by the operating system, a light weight context save operation to save a light weight context defined by the light yield field set of the first synergistic processing unit task; and dispatch, by the operating system, a second synergistic processing unit task of the plurality of synergistic processing unit tasks to the given synergistic processing unit.

3. A computer program product comprising a computer storage having a computer readable program stored thereon, wherein the computer readable program, when executed on a computing device, causes the computing device to:

receive, by an operating system, a request from a main application task that requests usage of synergistic processing unit resources by specifying a plurality of synergistic processing unit tasks that are to be executed on at least one synergistic processing unit;

detect and parsing, by the operating system, a light yield field set for each synergistic processing unit task of the plurality of synergistic processing unit tasks;

schedule, by the operating system, application run times for each synergistic processing unit task of the plurality of synergistic processing unit tasks based on priority, context switching cost information, and whether each synergistic processing unit task has real time guarantees using the light yield field set of each synergistic processing unit task;

dispatch, by the operating system, a first synergistic processing unit task of the plurality of synergistic processing unit tasks to a given synergistic processing unit within the at least one synergistic processing unit;

determine, by the operating system, whether a scheduled time to preempt the first synergistic processing unit task on the given synergistic processing unit is reached;

responsive to a determination that the scheduled time to preempt the first synergistic processing unit task on the given synergistic processing unit is reached, notify the first synergistic processing unit task to proceed to a light weight context point;

responsive to a determination that the first synergistic processing unit task has reached the light weight context point, perform, by the operating system, a light weight context save operation to save a light weight context defined by the light yield field set of the first synergistic processing unit task; and dispatch, by the operating system, a second synergistic processing unit task of the plurality of synergistic processing unit tasks to the given synergistic processing unit.

* * * * *